United States Patent
Chidiac et al.

(10) Patent No.: US 10,287,949 B2
(45) Date of Patent: May 14, 2019

(54) PHOTOCATALYTIC DEVICE AND METHOD FOR THE REDUCTION OF EXHAUST EMISSIONS

(71) Applicant: DRYWIRED, LLC, Beverly Hills, CA (US)

(72) Inventors: Camille Charles Chidiac, Vernon, CA (US); Kailey Rae Bradt, Beverly Hills, CA (US)

(73) Assignee: DRYWIRED, LLC, Beverly Hills, CA (US)

( * ) Notice: Subject to any disclaimer, the term of this patent is extended or adjusted under 35 U.S.C. 154(b) by 131 days.

(21) Appl. No.: 15/467,715

(22) Filed: Mar. 23, 2017

(65) Prior Publication Data
US 2018/0274425 A1 Sep. 27, 2018

Related U.S. Application Data

(60) Provisional application No. 62/313,021, filed on Mar. 24, 2016.

(51) Int. Cl.
| | | |
|---|---|---|
| *F01N 3/20* | (2006.01) | |
| *F01N 3/28* | (2006.01) | |
| *B01J 35/00* | (2006.01) | |
| *B01J 21/06* | (2006.01) | |
| *B01J 21/04* | (2006.01) | |
| *B01J 23/30* | (2006.01) | |
| *B01D 53/00* | (2006.01) | |

(Continued)

(52) U.S. Cl.
CPC ......... *F01N 3/2086* (2013.01); *B01D 53/007* (2013.01); *B01D 53/925* (2013.01); *B01D 53/94* (2013.01); *B01J 21/04* (2013.01); *B01J 21/063* (2013.01); *B01J 23/30* (2013.01); *B01J 35/004* (2013.01); *F01N 3/28* (2013.01); *B01D 2255/2092* (2013.01); *B01D 2255/20707* (2013.01); *B01D 2255/20776* (2013.01); *B01D 2255/802* (2013.01); *F01N 2570/10* (2013.01); *F01N 2570/14* (2013.01); *F01N 2570/145* (2013.01)

(58) Field of Classification Search
CPC . F01N 3/2086; B01J 35/004; B01D 2255/802
See application file for complete search history.

(56) References Cited

U.S. PATENT DOCUMENTS

| | | | | |
|---|---|---|---|---|
| 5,778,664 A | * | 7/1998 | Janata | B01D 53/007 60/274 |
| 6,122,909 A | | 9/2000 | Murphy et al. | |

(Continued)

FOREIGN PATENT DOCUMENTS

| | | |
|---|---|---|
| CN | 102162388 A | 4/2011 |
| CN | 102434253 B | 9/2011 |

(Continued)

*Primary Examiner* — Audrey K Bradley
(74) *Attorney, Agent, or Firm* — Snell & Wilmer L.L.P.

(57) ABSTRACT

The current invention consists of a method and device that is coated with at least one predeposited photocatalyst to reduce or eliminate exhaust emissions and powered by a thermoelectric generator. The method and device comprises a light source emitting sufficient light between 10 nm and 700 nm for the photocatalyst coating and a means to attach said method and device to the source of exhaust emissions.

23 Claims, 1 Drawing Sheet

(51) Int. Cl.
*B01D 53/94* (2006.01)
*B01D 53/92* (2006.01)

(56) References Cited

U.S. PATENT DOCUMENTS

| | | | |
|---|---|---|---|
| 6,468,428 B1 * | 10/2002 | Nishii | B01D 53/88 |
| | | | 210/497.3 |
| 8,409,851 B2 | 4/2013 | Jaggi | |
| 2001/0043890 A1 | 11/2001 | Son | |
| 2009/0283126 A1 * | 11/2009 | Rostek | F01N 5/025 |
| | | | 136/203 |
| 2014/0196439 A1 | 7/2014 | Dolan et al. | |

FOREIGN PATENT DOCUMENTS

| | | |
|---|---|---|
| CN | 201110105872 | 5/2013 |
| CN | 104888590 A | 5/2015 |

* cited by examiner

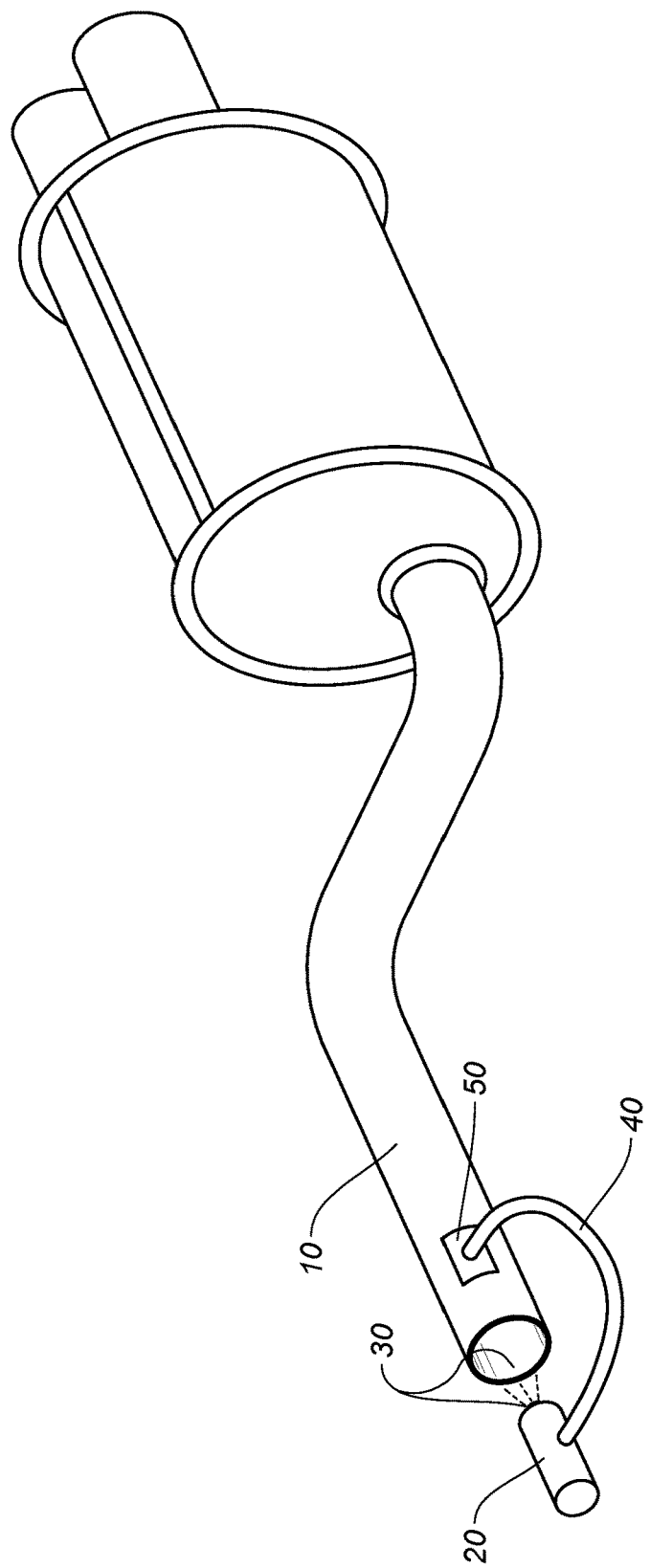

PHOTOCATALYTIC DEVICE AND METHOD FOR THE REDUCTION OF EXHAUST EMISSIONS

CROSS REFERENCE TO RELATED APPLICATIONS

This application claims the benefit of U.S. Provisional Patent Application No. 62/313,021 filed Mar. 24, 2016, entitled "Photocatalytic Device and Method for the Reduction of Exhaust Emissions", the disclosure of which is incorporated by reference herein in its entirety.

FIELD OF THE INVENTION

The present invention relates to a method and apparatus for decomposing and removing emissions from airborne particulates, including from human activities, such as the burning of fossil fuels in vehicles, coal combustion, power plants and various industrial processes. More particularly, the preferred embodiment of the invention relates to a method and apparatus for decomposing and reducing emissions produced by an internal combustion engine using one or more predeposited photocatalytic compounds.

BACKGROUND OF THE INVENTION

It is well known that combustion engine emissions, such as those of motor vehicles, emit pollutants such as nitrogen oxide compounds ($NO_x$), unburned hydrocarbons ($C_xH_y$) and carbon oxides ($CO$, $CO_2$) from the combustion of such common fuels as gasoline and diesel. In the presence of sunlight, volatile organic compounds (VOCs) and $NO_x$ can join to form ozone, a main contributor to smog. Smog has been known to harm human health and have negative effects on the surrounding ecosystems and environment. Major smog occurrences are often linked to heavy motor vehicle traffic.

In recent decades, much attention has been given to reducing emissions of $NO_x$, $C_xH_y$ and $CO_x$. For example, catalytic converter devices containing surfaces coated with platinum, palladium, or rhodium are used in the exhaust system of motor vehicles, downstream from the combustion engine in an attempt to reduce pollutants (such as $NO_x$, $C_xH_y$, and CO) to $N_2$, $O_2$, $CO_2$ and $H_2O$. However, some of the components of the catalytic converters are expensive. Additionally, not all of the pollutants are converted to less harmful bi-products, partly due to the fact that catalytic converters lose their efficiency over time.

In addition, those skilled in the art of photocatalytic coatings are familiar with titanium dioxide ($TiO_2$) and aluminum oxide ($Al_2O_3$), in paint and coatings to break down viruses, mold, bacteria, odors and volatile organic compounds. For example, recent patents and patent applications discuss using $TiO_2$ in attempts to reduce emissions (e.g., 6,122,909CA, 8,409,851B2 and EP 2721270 A1). It is also well known to those skilled in the art, that when certain photocatalysts, such as $TiO_2$, $Al_2O_3$, $WO_3$ and others are irradiated with light, the energy absorbed enables the production of hydroxyl radicals ($^-OH$) to decompose potentially harmful compounds, as originally discovered by Japanese scientist Dr. Akira Fujishima in 1967, incorporated herein by reference (Fujishima, Akira; Honda, Kenichi (7 Jul. 1972). "Electrochemical Photolysis of Water at a Semiconductor Electrode". Nature 238 (5358): 37-38)).

Energy from near ultraviolet light (potentially including wavelengths of up to 415 nm into the visible light range) allows for this photocatalytic reaction. For example, Chinese patent application number CN 201110105872 discusses using multiple ultraviolet (UV) lights inside of an automobile $TiO_2$-coated exhaust chamber and $TiO_2$-coated foam baffles and places the lights on sides the baffles of the exhaust chamber, which is also coated with $TiO_2$, thereby requiring a specially manufactured exhaust system to replace an existing exhaust system and engine intake. This solution would be expensive to execute and therefore difficult for some consumers to implement, especially if a goal is to reduce vehicle emissions in an older vehicle or a "retrofit" of any combustion engine which could use an emissions-reducing method and device.

In addition, titanium dioxide is used most efficiently and economically applied uniformly across a specified surface area exposed to a light source emitting the required amount of energy. Moreover, insufficient illumination can substantially inhibit the formation of hydroxyl radicals production. Incorporating sufficient illumination into the photocatalytic device placed in line with the existing combustion engine exhaust system could be relatively easily retrofitted to existing systems to reduce pollutants emitted. A cost-efficient retrofit may further assist people and entities comply with various emissions standards and regulations.

What is needed is a method and device that is cost-effective and easily installed in any motor vehicle, existing combustion engine exhaust port, and other various burning and industrial processes that employ sufficient UV light to a photocatalytic compound. Such a method and device could be easily and quickly installed in many applications, such as with exhaust chambers of internal combustion engines as well as emissions from various manufacturing entities and other emissions sources, thus having a major impact on the health of humans, animals, and our planet.

SUMMARY OF THE INVENTION

A photocatalytic device to reduce emissions in existing combustion engines, other various burning and industrial process exhaust systems.

The preferred embodiment of the invention includes a light source that emits light between 10 nm and 700 nm, uses a thermoelectric power source, and is coated with at least one predeposited photocatalytic compound selected from the group consisting of: $TiO_2$, $WO_3$, and $Al_2O_3$.

BRIEF DESCRIPTION OF DRAWINGS

The invention will be further described in connection with the accompanying drawings, in which illustrate aspects of embodiments of the invention.

FIG. 1 is an example of the side view of a light source, coated with at least one predeposited photocatalytic compound and a connecting means.

DETAILED DESCRIPTION OF PREFERRED EMBODIMENTS OF THE INVENTION

An embodiment of the current invention consists of an emission-reducing device and method, powered by a thermoelectric power source, and may also include a battery power source, an alternating current power source, a direct current power source, a solar power source or other external power source, that is attached to the exhaust port of an exhaust gas apparatus operating and discharging exhaust gas.

The emission-reducing device and method attached to the exhaust port to effect said reduction in emissions of at least one of $C_xH_y$, CO and $NO_x$ in exhaust gas discharged from the operating of said exhaust gas apparatus. The shape of the light source of the emission-reducing device and method can be a cylinder, cone, conical, prism, teardrop, airfoil, sphere, ogive, parabolic, folium, spiral, and spheroid shape. The light source may comprise a plurality of light sources.

The predeposited photocatalytic coated on the light source includes a coating on a lens of the light source. Further, the predeposited photocatalytic coated light source is attached to a predeposited photocatalytic coated attachment mechanism that attaches to the exhaust gas apparatus. The exhaust gas apparatus may be an exhaust pipe of a motor vehicle. The thermoelectric generator for powering the light source is also connected and part of the attachment mechanism. The predeposited photocatalytic coated light source may further comprise an attachment, said may include at least one of the following: the light source attachment mechanism and at least one porous grid which allows the exhaust gas to flow through said pores. The method and device is easy to install and can be attached to any exhaust port, including without limitation exhaust pipes of any type of motor vehicles.

Thermoelectric generators convert heat energy to electricity. Thermoelectric generators work using phenomenon in which a temperature difference between two dissimilar electrical conductors or semiconductors produces a voltage difference between the two substances and is known as the Seebeck Effect. These two dissimilar electrical conductors comprise a heat receiving connection as well as a heat removal connection of the thermoelectric generator. A phenomenon whereby heat is emitted or absorbed when an electrical current passes across a junction between two materials is known as the Peltier Effect. Thermoelectric generators are used to convert temperature differentials to electricity by the use of semiconductors that have high electrical conductivity and low thermal conductivity arranged in a way that p-type and n-type semiconductors can produce a dielectric current that will flow through the generative cell creating a circuit.

Referring now to FIG. 1, the purpose of the method and device is to use light source and predeposited photocatalyst coated on the light source and the attached predeposited photocatalytic coated attachment (40) to reduce emissions from the exhaust port. The light source (at least one "light bulb" or simply "bulb") (20) is coated with at least one predeposited photocatalytic compound selected from the group consisting of: $TiO_2$, $WO_3$, and $Al_2O_3$. (30). The predeposited photocatalytic coating (30) reacts with the light energy from the light source (20) and produces multi-clustered ions that are positively and negatively charged. These ions attach themselves to gas emission molecules passing through the exhaust to break them down into $CO_2$ and $H_2O$ and other less harmful byproducts. An amount of the environmentally harmful gases are thereby eliminated. The light source may emit light in the ultraviolet (UV) spectrum (10 nm to 400 nm), the visible light spectrum (380 nm to 700 nm), or both the UV and visible light spectrum (10 nm to 700 nm). In an embodiment, the predeposited photocatalyst coating (30) on the light source (20) comprises predominantly one or more oxides with a high melting point able to withstand temperatures between 0 to 900 degrees Celsius, but also may comprise a dopant in and/or on the predeposited photocatalyst coating. In an embodiment, the preferred range of thickness of the predeposited photocatalyst coating is between 100 nm to 1 micron. In another embodiment, the predeposited photocatalyst coating is at least semi-transparent and may be transparent.

In an embodiment, the device further comprises at least one light source (20) being coated with a predeposited photocatalytic coating (30). The predeposited photocatalytic coating may include a coating on the lens of the light source. In yet another embodiment, the device and method further comprises a series of porous grids surrounding the light source, also coated with a predeposited photocatalytic coating and connected to the device. In still yet another embodiment, the device further comprises an attachment mechanism (screw, bolt, clip and clasp) and a thermoelectric generator (50) connected to the device and used to attach the device to an exhaust gas apparatus (10).

In yet another embodiment, the method and device further comprises reducing emissions from an exhaust gas apparatus, comprising the steps of attaching a light source (s) coated with a predeposited photocatalyst (30) to said exhaust gas apparatus, connecting said light source to a thermoelectric power supply that provides power to said light source, including when an internal combustion engine is running, and said light source illuminates when said power is supplied to said light source, to effect said reduction in emissions of at least one of $C_xH_y$, CO and $NO_x$ in exhaust gas discharged, including from the operating of said internal combustion engine. Additionally, the light source may comprise a cone, conical, prism, teardrop, airfoil, sphere, ogive, parabolic, folium, spheroid, cylindrical 6r a spiral shape. The light source may also comprise a plurality of light sources. Further, the light source may comprise at least one photocatalyst-coated attachment connected to the device. (40) The photocatalyst-coated attachment may further comprise a porous grid allowing said exhaust gas to flow through said pores.

Another embodiment of the exhaust-reducing device further comprises a light source, (20) coated with a predeposited photocatalytic coating, (30) with a thermoelectric power source generator attachment and attachment mechanism (50) connected to the device and for drawing power to illuminate said light source, and a connecting means (40) also connected to the device for the light source to connect to an exhaust region. The light source may also comprise a plurality of light sources. The light source power source may further comprise a battery power supply, thermoelectric power supply, external power supply, solar power supply, or an alternating current power supply. The light source may be of a cone, conical, prism, teardrop, airfoil, sphere, ogive, parabolic, folium, spheroid, cylindrical or a spiral shape.

In addition, the light source may further comprise at least one predeposited photocatalytic-coated attachment. Such attachment may comprise coated porous grid allowing said exhaust gas to flow through said pores providing more surface area for the photocatalytic reaction.

In an embodiment, the connecting means (40) connects the light source (20) to an exhaust pipe (10) of a vehicle.

In the preferred embodiment, an exhaust-reducing device and method comprises a light source (20) coated with a predeposited photocatalytic coating (30) deposited on the surface of said light source and the lens of the light source, said light source connecting an attachment (40) and said attachment connected to a thermoelectric power supply and attachment mechanism (50) to provide energy to said light source (20) and attached to said device and method to an exhaust port of said internal combustion engine. This light source attachment mechanism (50) is selected from the group consisting of a screw, bolt, clip and clasp. The method and device may comprise of a plurality of said light sources.

The photocatalytic coating (30) of the light source (20) may consist of at least one of $TiO_2$, $WO_3$, and $Al_2O_3$.

What is claimed is:

1. A method to reduce emissions from an exhaust gas apparatus, comprising the steps of:
    attaching a predeposited photocatalytic coated light source to a predeposited photocatalytic coated attachment mechanism,
    connecting said predeposited photocatalytic coated attachment mechanism to said exhaust gas apparatus,
    connecting said light source to a thermoelectric generator that provides power when said exhaust gas apparatus is operating and discharging exhaust gas, and said light source illuminates when said power is supplied to said light source to effect said reduction in emissions of $CxH_y$, CO and $NO_x$ in exhaust gas discharged from the operating of said exhaust gas apparatus.

2. The method according to claim 1, wherein said light source consists of a shape selected from the group consisting of: cylinder, cone, prism, teardrop, airfoil, sphere, ogive, folium, spheroid, spiral.

3. The method of claim 1, wherein said predeposited photocatalytic coated light source further comprises at least one porous grid allowing said exhaust gas to flow through said pores.

4. The method of claim 1, wherein said light source emits light in the spectrum of at least one of the group consisting of: visible light and ultraviolet light.

5. The method of claim 1 wherein said predeposited photocatalytic coating consists essentially of at least one of the group selected of: $TiO_2$, $WO_3$, and $Al_2O_3$.

6. The method of claim 1, wherein said predeposited photocatalytic coating of said light source coats a lens of said light source.

7. The method according to claim 6, wherein said light source consists of a shape selected from the group consisting of: cylinder, cone, prism, teardrop, airfoil, sphere, ogive, folium, spheroid, spiral.

8. The method of claim 1, wherein said light source comprises a plurality of said light sources.

9. The method according to claim 8, wherein each said light source of said plurality consists of a shape selected from the group consisting of: cylinder, cone, prism, teardrop, airfoil, sphere, ogive, folium, spheroid, spiral.

10. An exhaust-reducing device comprising:
    a light source coated with at least one predeposited photocatalyst;
    a thermoelectric power source connected to said light source for drawing power to illuminate said light source; and
    a predeposited photocatalytic coated connecting means attached to said light source for said light source to connect to an exhaust region.

11. The device of claim 10, wherein said predeposited photocatalytic coating of said light source coats a lens of said light source.

12. The device of claim 10, wherein said light source comprises a plurality of said light sources.

13. The device of claim 10, wherein said light source consists of a shape selected from the group consisting of: cylinder, cone, prism, teardrop, airfoil, sphere, ogive, folium, spheroid, or spiral.

14. The device of claim 10, wherein said predeposited photocatalyst coated light source further comprises at least one porous grid allowing said exhaust gas to flow through said pores.

15. The device of claim 10, wherein said exhaust-reducing device is attached to the interior of an exhaust pipe of a vehicle with an internal combustion engine.

16. The device of claim 10, wherein said light source emits light in the spectrum of at least one of the group selected of: visible light and ultraviolet light.

17. An exhaust-reducing device comprising:
    a light source coated with at least one predeposited photocatalyst,
    a thermoelectric generator connected to said light source; and
    an attachment mechanism attached to said light source designed to attach said device to an exhaust port,
    wherein said photocatalytic coating is selected from the group consisting essentially of: $TiO_2$, $WO_3$, and $AL_2O_3$,
    wherein said attachment mechanism is selected from the group consisting of: screw, bolt, clip and clasp.

18. The device of claim 17, wherein said predeposited photocatalytic coating of said light source coats a lens of said light source.

19. The device of claim 17, wherein said device comprises a plurality of said light sources.

20. The device of claim 17, wherein said light source consists of a shape selected from the group consisting of: cylinder, cone, prism, teardrop, airfoil, sphere, ogive, folium, spheroid.

21. The device of claim 17, wherein said light source emits light in the visible light spectrum.

22. The device of claim 17, wherein said light source emits light in the ultra violet light spectrum.

23. The device of claim 17, wherein said light source emits light between 10 nm and 700 nm.

* * * * *